No. 783,710.

Patented February 28, 1905.

UNITED STATES PATENT OFFICE.

EBENEZER W. STRAIN, OF PHILADELPHIA, PENNSYLVANIA.

RUBBER COMPOUND.

SPECIFICATION forming part of Letters Patent No. 783,710, dated February 28, 1905.

Application filed January 26, 1904. Renewed January 21, 1905. Serial No. 242,146.

*To all whom it may concern:*

Be it known that I, EBENEZER W. STRAIN, a citizen of the United States, residing at Philadelphia, in the county of Philadelphia and State of Pennsylvania, have invented new and useful Improvements in Rubber Compounds, of which the following is a specification.

My invention relates to certain new and useful improvements in the class of goods known as "rubber compounds;" and it consists, broadly, in the employment of a distillate of rosin in the manufacture of rubber goods. It has long been a desideratum in this art to combine rosin with rubber or rubber substitutes in the manufacture of rubber goods, and this has been repeatedly attempted but the universal experience has been, so far as my knowledge extends, that the rubber goods having rosin incorporated therewith would crack with age and be rendered useless. I have discovered that a distillate of rosin possesses a great affinity for rubber and when combined therewith forms a compound that will not crack with age. In like manner and with similar results it may also be combined with the class of goods or compounds in general use known as "rubber substitutes."

In addition to the above discovery my invention also relates to a novel compound composed of certain ingredients, including the distillate of rosin, which I find peculiarly adapted for the purpose of providing a cheap compound that will readily combine with rubber or rubber compounds.

In producing a compound according to my invention I first take a quantity of rosin and subject the same to a single distillation. I next take a quantity of clay—china-clay preferred—and after grinding the same to a fine powder mix it with linseed-oil until a paste-like mass is obtained free from lumps or grit. A given quantity of this paste is then added to the distillate of rosin. I then add to the resultant mass a quantity of rubber solution which is prepared, as usual, by dissolving raw rubber in benzin, turpentine, or rosin distillate. The proportions, by weight, of the ingredients used are as follows: Rosin distillate, eighty per cent.; linseed-oil mixed with china-clay or other clay, ten per cent.; rubber solution, ten per cent. The ingredients named mixed in about the proportions given are then placed in an ordinary paint-mixer, which is maintained at a temperature of about 150° Fahrenheit, and subjected to agitation until all the ingredients are thoroughly combined to form a homogeneous mass. The compound is then removed from the mixer, allowed to cool or partly cool, and then manipulated or "worked out" in the manner familiar to those skilled in the art. The above compound possesses all of the characteristics of rubber, including the capability of being vulcanized, and may be cheaply produced. The rosin used is what is known as "North Carolina rosin." Other kinds of rosin may of course be used but I find that named to be best suited for the purpose.

In order to render the linseed-oil non-oxidizable, so that it will not harden or crack, before having the clay admixed therewith, the oil is placed in a closed tank having a vapor-outlet and is subjected to heat at a temperature of 550° Fahrenheit for about ten hours without exposure to the air.

The proportions named herein may of course be varied, and I do not, therefore, wish to be limited to the use of the ingredients in the proportions indicated, except so far as specified in the claims appended hereto.

The above compound, forming one part of my invention, will also serve to illustrate one manner of employing the distillate of rosin. I wish it understood, however, that my invention contemplates the use of the rosin distillate with any combination of ingredients for forming rubber compounds or with rubber alone or with rubber substitutes.

The compound described is of an opaque or colorless nature and is especially adapted for use in the manufacture of white rubber goods. It can of course be used equally as well in the manufacture of dark rubber goods. The compound is not greasy and will therefore not work out to the surface of the goods. It is also of a non-oxidizable nature and will not become hard and liable to crack. Furthermore, the compound is of a fluid or semifluid consistency, enabling the manufacturer to readily combine therewith the harder and drier forms of rubber and rubber substitutes.

While I have found in the special compound named that a single distillate of rosin is desirable, I may employ a second or third distillate if the same be found of utility.

Having thus fully described my invention, what I claim as new is—

1. A rubber compound including as its chief ingredient a distillate of rosin.

2. A rubber compound comprising a distillate of rosin having combined therewith linseed-oil, clay and a rubber solution.

3. A rubber compound comprising a distillate of rosin having combined therewith linseed-oil, china-clay and a rubber solution, the ingredients being mixed in about the proportions stated.

In testimony whereof I have hereunto set my hand in presence of two subscribing witnesses.

EBENEZER W. STRAIN.

Witnesses:
FRANCIS M. GARDNER,
E. F. LUMMIS.